United States Patent

Scott et al.

[15] 3,661,208
[45] May 9, 1972

[54] CONTROL OF GRAVITY SEGREGATION BY HIGH DENSITY FLUID INJECTION

[72] Inventors: J. O. Scott; Charles L. Hern, both of Tulsa, Okla.

[73] Assignee: Cities Service Oil Company

[22] Filed: June 2, 1970

[21] Appl. No.: 42,898

[52] U.S. Cl. ........................................................166/274
[51] Int. Cl. ..................................................E21b 43/22
[58] Field of Search ..........................166/268, 269, 273, 274

[56] References Cited

UNITED STATES PATENTS

| 3,003,554 | 10/1961 | Craig et al. ........................166/274 |
| 2,623,596 | 12/1952 | Whorton et al. ....................166/274 |
| R24,873 | 9/1960 | Lindauer et al. ...................166/268 |
| 2,875,830 | 3/1959 | Martin ..............................166/274 X |
| 2,878,874 | 3/1959 | Allen ................................166/274 X |
| 3,240,272 | 3/1966 | Orkiszewski.......................166/274 |

FOREIGN PATENTS OR APPLICATIONS

| 664,186 | 6/1963 | Canada...............................166/274 |

Primary Examiner—Stephen J. Novosad
Attorney—J. Richard Geaman

[57] ABSTRACT

Gravity segregation is controlled and oil recovery enhanced by the controlled injection of a high density miscible fluid, such as carbon dioxide, into an oil bearing formation. Pressure within the formation is maintained so that the density of the injected fluid is equal to or as close to that of the oil as possible. Generally, the density of the miscible fluid should be maintained within about 10 percent of the density of the oil to be displaced. Mixtures of the miscible fluid and displaced oil are produced from the lower portions of the reservoir so that the miscible fluid will sweep the entirety of the reservoir and thereby avoid bypassing oil by gravity segregation of oil and miscible fluid.

7 Claims, 5 Drawing Figures

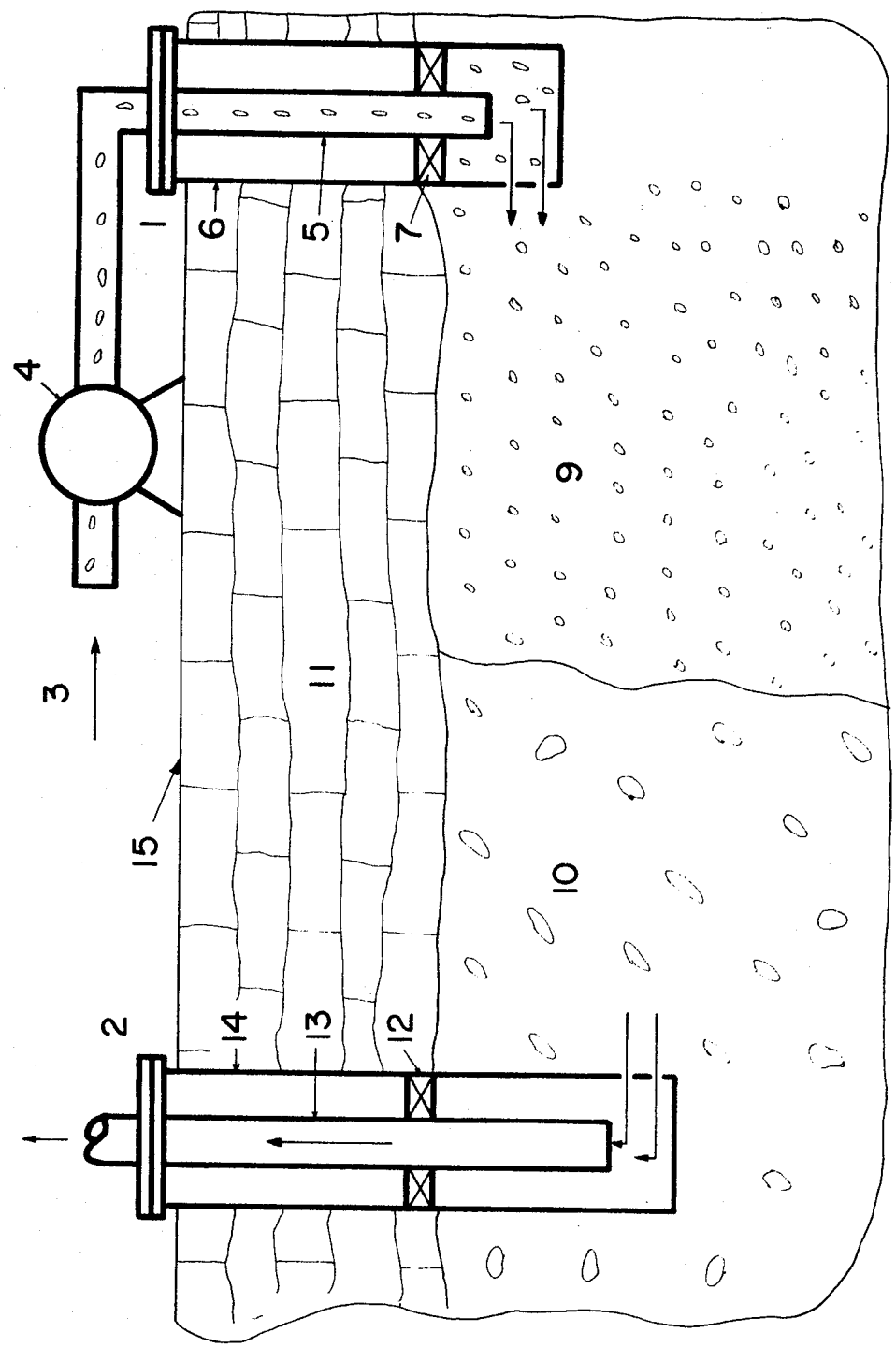
FIG I

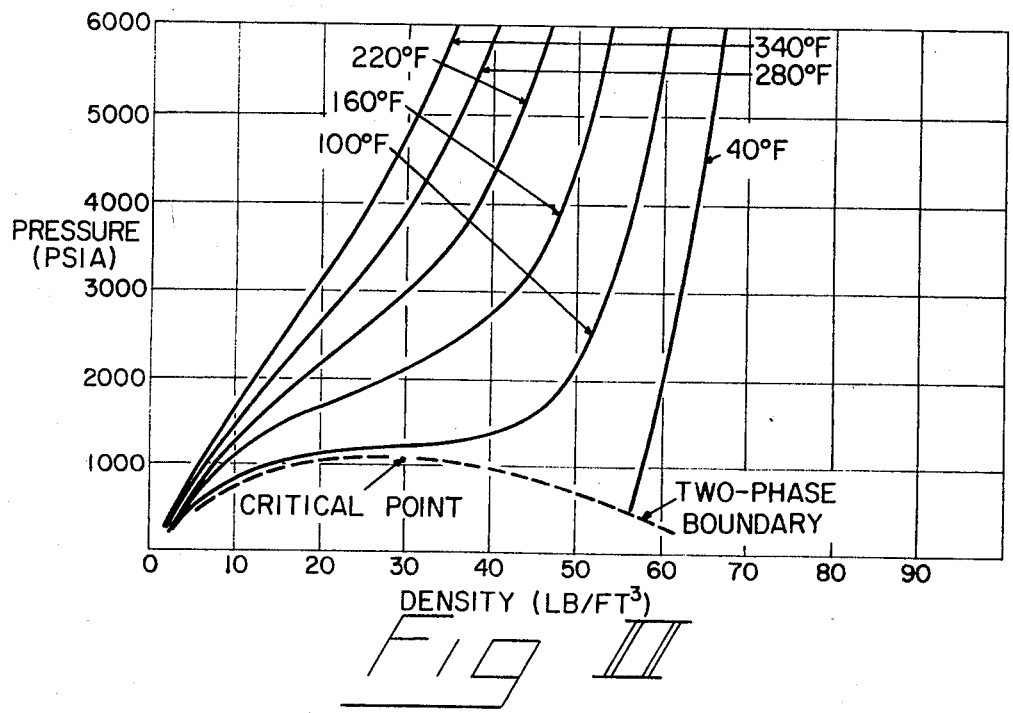
Fig. II
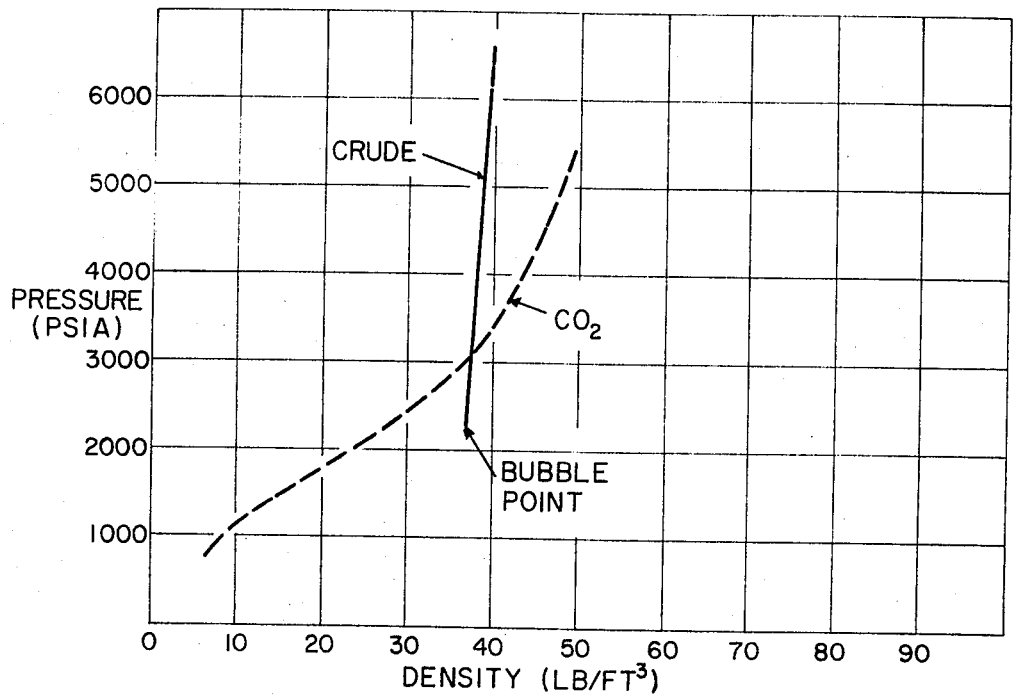
Fig. III
J.O. SCOTT,
CHARLES L. HEARN, INVENTOR.
BY J. Richard Geaman
ATTORNEY

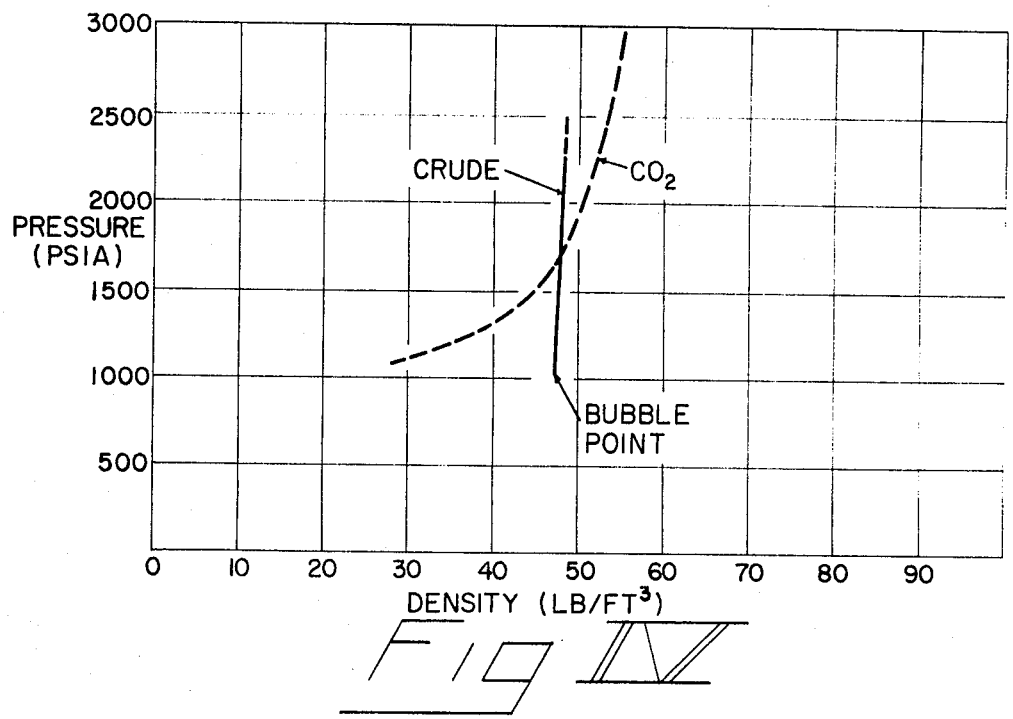
Fig. IV
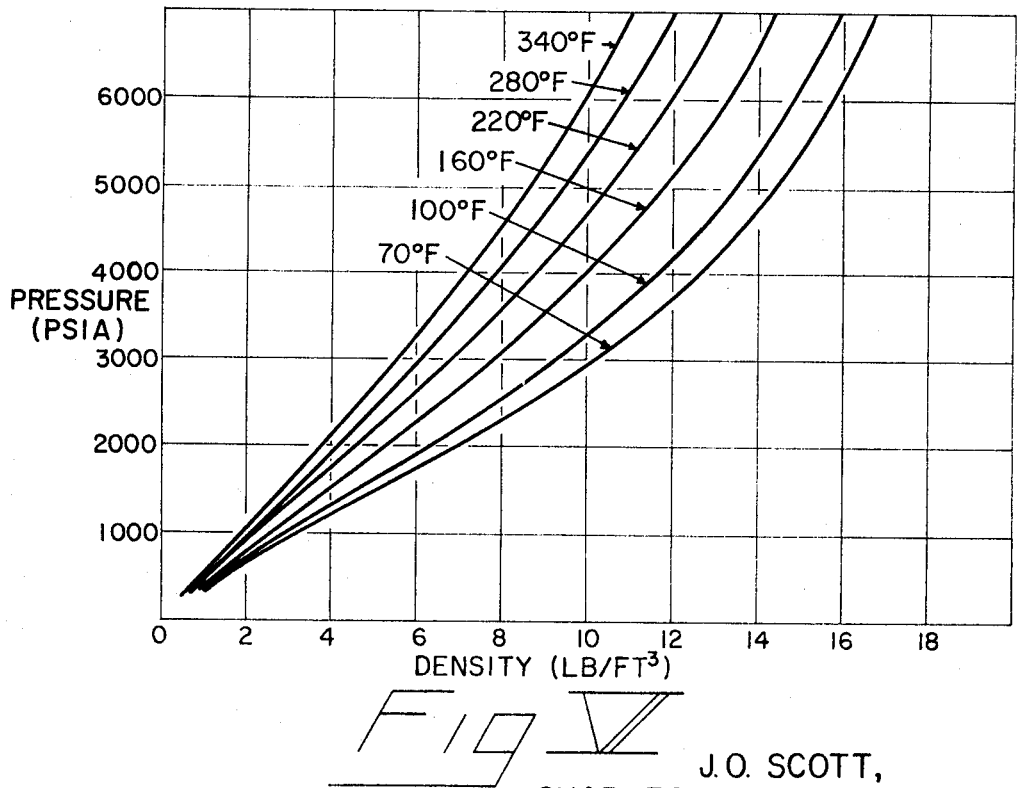
Fig. V

CONTROL OF GRAVITY SEGREGATION BY HIGH DENSITY FLUID INJECTION

BACKGROUND OF THE INVENTION

This invention relates to the recovery of oil from subterranean reservoirs. More particularly, it relates to the secondary recovery of oil from subterranean reservoirs by the introduction of an oil-miscible fluid at conditions of temperature and pressure so as to control the density of the injected fluid and reduce the adverse effects of gravity segregation of fluids within the subterranean reservoir.

The efficiency of an oil recovery process applied to a subterranean reservoir is determined by the ultimate recovery of oil as compared to the oil in place at the initiation of the process. The efficiency of the oil recovery depends upon the vertical sweep efficiency, the horizontal sweep efficiency and the displacement efficiency. The horizontal sweep efficiency is the efficiency which pertains to the areal coverage of a driving fluid in a horizontal plane. The displacement efficiency relates to the volume of driven fluid actually recovered from a particular unit or reservoir by displacement with a driving fluid. Of particular importance, however, and of primary concern is that of the improvement of the vertical sweep efficiency. Vertical sweep efficiency is defined and referred to herein as the area of the reservoir contacted by the driving fluid in any vertical plane within the reservoir between the input well and the producing well divided by the total area of the vertical plane between the wells.

Previous applications of secondary recovery have given considerable effort to the effects of reservoir heterogeneity, mobility ratio and density differences between the driving and driven fluids on increasing recovery of oil from subterranean oil reservoirs. It has been generally agreed that oil recovery from a reservoir will be increased in a frontal drive such as a water flood, gas drive, or solvent drive, with mobility ratio kept at a minimum. Those skilled in the art have recognized that reservoirs which are saturated with a gas exhibit segregation of the fluids according to the densities of the reservoir fluids contained therein; the lighter fluids are almost always found above the denser fluids in a virgin reservoir. It has been reasoned that even though a secondary recovery process extends over a period of time which is negligible in comparison to geologic time, there is nevertheless some segregation between the driving and driven fluids due to the differences in density. This is generally referred to as gravity segregation. Gravity segregation during secondary recovery is, of course, undesirable as it permits the driving fluid to bypass under or over the oil to be displaced and the bypassed oil is not recovered in these bypass zones. Considerable effort has been expended to find a secondary recovery process with adequately overcomes the adverse effects of gravity segregation, however, no suitable process has been developed which will overcomen this problem.

The control of gravity segregation by miscible fluids is taught in Canadian Pat. No. 668,449, issued Aug. 13, 1963, to Craig, et al. The principal process described in the teachings by Craig, et al. is that of recovering oil from a subterranean reservoir in which gravity segregation is a primary problem, such as occurs when a reservoir is subjected to a solvent drive operation. The steps of the process taught comprise forming an intermediate driving fluid which comprises at least two fluids of different densities and mutually soluble in one another and dissolving said mixture into the oil. At least one of the fluids has a higher and one of the fluids has a lower density than that of the oil with which they are mixed. The amounts of each fluid are adjusted so that the intermediate driving fluid has a density difference intermediate to the driving fluid and the oil. This mixture is injected into the reservoir with the resulting intermediate driving fluid of adjusted density displacing the oil as it is driven through the reservoir by subsequent injection of a scavaging liquid having a mobility substantially lower than the mobility of the intermediate driving fluid. A typical scavaging fluid would be water, and a typical intermediate driving fluid would be a mixture of LPG or an amphipathic solvent with a dense liquid selected from the group consisting of hydrogen sulphide, carbon disulphide, carbon tetrachloride and carbon dioxide. An inherent problem in the teaching of Craig, et al., is that as the intermediate slug passes from the injection to the production wells, fingering will occur and a loss of slug dimension will result. Although gravity segregation is partially controlled for a limited time, as the slug approaches the vicinity of the production well, it will be broken off as fingers of the driving fluid push through the slug, leaving behind uncontacted portions of the reservoir, thereby losing a vital source of oil recovery.

Another method for improved secondary recovery of oil from subterranean reservoirs in which gravity segregation is normally a severe problem is that taught by Miller, U.S. Pat. No. 3,363,684. Miller teaches the injection of an increased density fluid behind the oil-water interface when a water aquifer is encroaching an oil reservoir. The improved oil recovery is achieved by injecting salt water below the level of the water-oil contact. The salt concentration is such that the density of the brine is much greater than the reservoir oil density. In practicing the teachings of Miller, salt water is pumped into the input well in continuous quantities so that the reservoir in the vicinity of the input well becomes saturated with a high-density brine. It is assumed that the crude oil to be recovered in a reservoir has a density less than that of the original water aquifer, and also has a lesser density than the flooding water being supplied. Therefore, as the high density flooding water is supplied, the oil in the reservoir is displaced and floated to the surface by the intermittently added flooding water. The oil is floated to the vicinity of a producing well and produced at the surface. This method does not provide for a density of the flooding fluid intermediate to that of the densities of the aquifer water and the reservoir oil and, in addition, the salt water is not miscible with the oil. Therefore, gravity segregation exists and a high saturation of residual oil is left behind.

What is desired is a flooding material which is both miscible with the reservoir oil and has a density near that of the reservoir fluid to be displaced so that the driving fluid will not override or underride the reservoir oil. The flooding material should have the ability to dissolve in and swell the reservoir oil and render it more mobile, thereby displacing more reservoir oil and leaving less residual oil behind the driven oil bank.

It is an object of this invention to provide an improved method for the miscible displacement of oil from subterranean reservoirs.

It is still another object of the present invention to utilize the density characteristics of miscible gases at high pressures, such as exhibited by carbon dioxide, to overcome the phemonenon of gravity segregation during the miscible displacement of the oil bearing reservoirs.

With these and other objects in mind, the present invention is hereinafter set forth with particular reference to the following description and drawings.

SUMMARY OF THE INVENTION

The objects of the present invention are accomplished by an improved flooding process for the recovery of oil from subterranean reservoirs of the type wherein a miscible fluid is introduced into a reservoir containing oil and drives the reservoir oil to a point where it is removed through a production well to the earth's surface. The improvement comprises introducing the miscible fluid into the reservoir while maintaining reservoir conditions of pressure and temperature so that the miscible fluid has a density essentially the same as that of the reservoir oil. The miscible fluid is driven through the reservoir by continuous injection of miscible fluid or subsequent injection of another driving fluid so as to contact the reservoir oil, dissolve in it, lower the reservoir oil's viscosity, and drive the reservoir oil to a point of removal to the earth's surface through the production well. Miscible fluids, such as carbon dioxide, which exhibit a high density at reservoir conditions may be injected into the reservoir so that the reservoir pressure is maintained at the pressure required for the miscible fluid to exhibit a density equal to the reservoir oil density. Therefore, the reservoir pressure is increased or decreased so that the miscible fluid density will be equal to that of the oil which is being displaced and gravity segregation within the reservoir will be eliminated.

BRIEF DESCRIPTION OF THE DRAWINGS

The present invention is hereinafter described in further detail with particular reference to the accompanying drawings in which:

FIG. 1 represents a cross-sectional view of a subterranean oil reservoir with the improved miscible displacement process of the present invention depicted therein;

FIG. 2 depicts the density of carbon dioxide, a preferred miscible fluid for use in the method of the present invention, as a function of pressure as compared to the density of a crude oil;

FIG. 3 depicts the respective densities of carbon dioxide and a crude oil at 194° F. as a function of pressure;

FIG. 4 depicts the density of carbon dioxide at 92° F. as a function of pressure as compared to the density of another crude oil; and FIG. 5 depicts the density of methane, a miscible gas, which under normal reservoir conditions encountered is not suitable for use in the method of the present invention, as a function of temperature and pressure.

DETAILED DESCRIPTION OF THE INVENTION

The present invention is concerned with a method of controlling gravity segregation in a miscible fluid drive by adjusting the density of the injected fluid. It is desired that the density of the injected fluid be equal to or as close as possible to that of the oil which is being miscibly displaced within the reservoir. Control is achieved by adjusting the reservoir pressure such that the density of the miscible fluid injected and the reservoir oil are as near equal as may be obtained through manipulation of the injection pressure of the miscible fluid. Therefore, the reservoir pressure is increased or decreased to that point where the miscible fluid density will be equal to that of the oil which is being displaced so that gravity segregation will not occur. In some reservoirs, it may be physically impossible to control the pressure at this point. Under these conditions, the pressure is controlled such that the density of the miscible fluid is as close as possible to the oil density and preferably greater than rather than less than the oil density. It has been found that a density of the miscible fluid within ten percent of the oil will suffice. To allow for change in density due to the pressure drop around the injection well, the point of the injection should be chosen so as to cause gravity cross flow in the reservoir until the densities become equal. Therefore, at the injection well, miscible fluid would be injected normally into the upper portion of the stratified or homogeneous reservoir, whichever the case may be. Concurrently, at the production well, the miscible fluid-oil displacement mixture is produced from the lower portion of the reservoir so that the miscible fluid will sweep the entirety of the reservoir.

In the operation of the present invention, laboratory tests should first be conducted with the miscible fluid, for instance carbon dioxide, and a sample of the reservoir fluid at the proposed reservoir conditions. These laboratory tests will determine the pressure necessary to maintain the required injection fluid density at the reservoir temperature. Carbon dioxide or other fluid is then injected into the injection wells which may be arranged in any pattern. Reservoir pressures may be controlled by regulating the ratio of injected to withdrawn fluids until the desired pressure is achieved.

It should be noted that it is not a requirement of this invention that the driving fluid be miscible with the reservoir fluid, although such condition will obviously result in an improved oil displacement and oil recovery. Carbon dioxide will be miscible with most reservoir oils at normally incurred reservoir conditions and therefore yield an excellent horizontal and vertical sweep efficiency under the conditions stipulated by the present invention.

The present invention may be more easily understood by referral to one embodiment of the invention as depicted by FIG. 1. A well drilled to form injection well 1 comprising wellbore casing 6 and tubing string 5 is utilized to introduce miscible fluid 3 into reservoir 16. Miscible fluid 3 is pressured at the earth's surface 15 by compression means 4 and introduced through tubing string 5 into reservoir 16, which is overburdened by rock 11. Miscible fluid 3 is introduced into the reservoir 16 so as to contact reservoir oil 10 to form miscible fluid bank 9 and is restricted to injection into this region by isolation means 7. Miscible fluid bank 9 exhibits a density at the reservoir temperature and adjusted reservoir pressure, as near as possible to that of the reservoir oil 10. Therefore, miscible fluid bank 9 drives the reservoir oil 10 towards the production well 2, comprising wellbore casing 14 and tubing string 13. Isolation means 12 is positioned between wellbore casing 14 and tubing string 13 to restrict the reservoir fluid flow within tubing string 13. If a gas cap exists, production well 2 may be completed in the upper region of the oil reservoir 16, with no early miscible fluid breakthrough and a maximum production of reservoir oil 10 obtained. Should a miscible gas be utilized in the present invention, the breakthrough of the gas will aid the producing ability of the reservoir fluid with a gas-lift mechanism occurring, thereby affording a free energy source for lifting and producing reservoir fluids from the reservoir. Since the density of miscible fluid is as near as possible to that of the reservoir oil being displaced, the miscible fluid bank will tend to remain in a homogeneous form with a definite continuity to the front of the miscible fluid bank 9 so that the fluid will not bypass the oil and migrate to the structurally higher portions of the reservoir 16 as is the tendency in many of the gas injection processes.

A particular miscible fluid which fits the qualifications of the present invention is carbon dioxide. Carbon dioxide is miscible with most reservoir oils at pressure greater than approximately 1,500 pounds per square inch at reservoir temperatures normally encountered. The actual pressure at which carbon dioxide becomes miscible with a given oil must be determined by laboratory tests involving the solubility of the carbon dioxide in the reservoir fluid. To gain further understanding of the present invention, the following discussion is presented. FIG. 2, which depicts the density of carbon dioxide as a function of pressure and temperature illustrates that carbon dioxide has a relatively high density at low pressures and may exhibit densities equivalent to that of the oil displaced from the reservoir at typical reservoir conditions of temperature and pressure. Therefore, it may be discerned that carbon dioxide will be a most efficient displacement medium for many reservoir crude oils. This particular facet of the invention is depicted by FIG. 3 in which the density of carbon dioxide is compared with a crude oil at a reservoir temperature of 194° F. It can be seen that at pressures greater than 3,000 psia carbon dioxide will exhibit a density greater than that of the crude oil. Therefore, in the application of carbon dioxide for a miscible gas drive in a reservoir containing the given crude oil at 194° F. the injection will be maintained such that reservoir pressure exhibited will be about 3,000 psia. In FIG. 4, the density of carbon dioxide is compared with the density of a crude oil at a reservoir temperature of 92° F. It can be seen by FIG. 4 that carbon dioxide at pressures above about 1,700 psia will exhibit a density greater than that of the reservoir crude oil. Therefore, a carbon dioxide miscible gas drive utilizing this crude oil at 92° F. would be maintained such that the reservoir pressure would be about 1,700 psia. As a comparison, the density of methane, a typically utilized miscible gas which does not exhibit a high density with pressure, as a function of pressure and temperature is shown in FIG. 5. FIG 5 illustrates that even at elevated pressures and low reservoir temperatures methane will not normally exhibit a density equivalent to that of a crude oil. Therefore, under most reservoir conditions, methane or natural gas, of which methane is the principle component, may not qualify as an injection fluid for this invention. The reservoir's conditions will seldom occur in which the reservoir fluid will exhibit a low enough density for methane to be utilized.

Although carbon dioxide injection will normally be stopped after a sufficient bank of miscible fluid has been formed, it may be necessary to continue injection indefinitely. The carbon dioxide bank formed may be followed by a standard waterflood or use of another driving medium so that maximum utilization of the carbon dioxide and its benefits may be obtained while a limited amount of carbon dioxide injection is required. If the reservoir pressure should fall below the desired value, it may be necessary to inject additional drive material or carbon dioxide to maintain reservoir pressure. By this method, reservoir pressure may be maintained at the pressure necessary to sustain the carbon dioxide density as near as possible to that of the reservoir oil.

The present invention in its many embodiments provides a highly significant method for the recovery of oil from reservoirs. Reservoirs which were previously determined to be unsuitable for miscible displacement recovery due to gravity segregation may be miscibly displaced by use of the process of the present invention. Recovery of oil from reservoirs abandoned, or near abandonment. Due to high gas-oil ratios produced from gravity segregation may be returned to productivity by use of the miscible gas injection procedures described herein so that the total oil recovery therefrom is enhanced.

The invention has been described herein with respect to particular embodiments and aspects thereof and it will be appreciated by those skilled in the art that various changes and modifications may be made, however, without departing from the scope of the invention as presented.

Therefore, we claim:

1. In a miscible gas process for the recovery of oil of the type wherein miscible fluid consisting essentially of a single oil-miscible gas is introduced into an oil reservoir and drives the reservoir oil contained therein to a point where it is removed through a production well to the earth's surface, the improvement which comprises maintaining the reservoir at such a pressure, relative to the reservoir temperature, that the miscible fluid has a density essentially the same as that of the reservoir oil.

2. The process of claim 1 in which the density of the miscible fluid is maintained within about 10 percent of the density of the reservoir oil.

3. The process of claim 1 in which the miscible fluid is carbon dioxide.

4. The process of claim 1 further comprising subsequently injecting a driving fluid, other than the miscible fluid, into the injection well while maintaining said reservoir pressure.

5. The process of claim 4 in which the miscible fluid is carbon dioxide and the driving fluid is water.

6. The process of claim 5 in which the miscible fluid and reservoir oil are produced from the lower portion of the reservoir.

7. The process of claim 1 in which the miscible fluid is injected into the upper portion of the reservoir.

* * * * *